United States Patent
Choi (10) Patent No.: US 9,080,852 B2
(45) Date of Patent: Jul. 14, 2015

(54) DISPLACEMENT SENSOR AND A MAGNETIC BEARING SYSTEM USING THE SAME

(75) Inventor: Sang-Hyun Choi, Seoul (KR)

(73) Assignee: FOSHAN GENESIS AMB TECH CO., LTD., Foshan (CN)

( * ) Notice: Subject to any disclaimer, the term of this patent is extended or adjusted under 35 U.S.C. 154(b) by 373 days.

(21) Appl. No.: 13/582,506

(22) PCT Filed: Feb. 28, 2011

(86) PCT No.: PCT/KR2011/001397
§ 371 (c)(1),
(2), (4) Date: Oct. 9, 2012

(87) PCT Pub. No.: WO2011/108831
PCT Pub. Date: Sep. 9, 2011

(65) Prior Publication Data
US 2013/0057097 A1    Mar. 7, 2013

(30) Foreign Application Priority Data

Mar. 2, 2010 (KR) .................. 10-2010-0018592

(51) Int. Cl.
*H02K 11/00* (2006.01)
*G01B 7/14* (2006.01)
*F16C 32/04* (2006.01)
*G01D 5/20* (2006.01)

(52) U.S. Cl.
CPC .............. *G01B 7/144* (2013.01); *F16C 32/044* (2013.01); *F16C 32/0448* (2013.01); *G01D 5/2046* (2013.01)

(58) Field of Classification Search
USPC .......................... 310/68 B, 90.5; 324/207.17
See application file for complete search history.

(56) References Cited

U.S. PATENT DOCUMENTS

| | | | | |
|---|---|---|---|---|
| 5,486,729 A * | 1/1996 | Matsushita et al. | .......... | 310/90.5 |
| 5,844,339 A * | 12/1998 | Schroeder et al. | ........... | 310/90.5 |
| 6,078,119 A * | 6/2000 | Satoh et al. | .................. | 310/90.5 |
| 6,326,712 B1 * | 12/2001 | Nakazawa et al. | .......... | 310/90.5 |
| 2009/0079284 A1 * | 3/2009 | Onuma et al. | ............... | 310/90.5 |
| 2009/0096302 A1 * | 4/2009 | Barada et al. | ................ | 310/90.5 |

* cited by examiner

*Primary Examiner* — Thanh Lam (74) *Attorney, Agent, or Firm* — Lexyoume IP Meister, PLLC (57) ABSTRACT

In a displacement sensor and a magnetic bearing system using the same, the displacement sensor includes: a first coil unit including at least one first coil; a second coil unit including at least one second coil differentially connected to one side of the at least one first coil of the first coil unit; a sensor drive means for supplying a first power source voltage and a second power source voltage having the same drive frequency to the first coil unit and the second coil unit, respectively; and a detection circuit for extracting displacement information from a differential signal produced by the first coil unit and the second coil unit due to a change in inductances of the at least one first coil and the at least one second coil according to a position change of a displacement measurement object.

5 Claims, 7 Drawing Sheets

DISPLACEMENT SENSOR AND A MAGNETIC BEARING SYSTEM USING THE SAME

TECHNICAL FIELD

The present invention relates to a sensor field, and more particularly, to a displacement sensor and a magnetic bearing system using the same.

BACKGROUND ART

A sensor for detecting and signalizing a displacement of a displacement measurement object is referred to as a displacement sensor, and especially, a displacement sensor which uses a differential signal due to a change in a mutual inductance according to a change in a position of an object is referred to as an inductive displacement sensor. In general, an inductive displacement sensor includes coils causing a mutual inductance change when a position of a displacement measurement object is changed, a sensor driving means for supplying a drive voltage, a differential circuit for outputting a differential signal according to a change in the mutual inductance, and a detection circuit for detecting amplitude information from a differential signal obtained from the differential circuit.

Magnetic bearings for supporting a rotary body by using a magnetic force without directly contacting the rotary body are widely employed in general industrial products. A magnetic bearing has an unstable property in a suction direction of pulling a rotary body or in a vertical direction according to its technology. In order to solve the unstable element and successfully realize the magnetic bearing, a control technology for detecting a displacement of a rotary body and regulating a current accordingly to support the rotary body at a predetermined position is important. That is, since a precision and an accuracy of a magnetic bearing vary according to a performance of a displacement sensor for detecting a change in position of a rotary body, a technology of improving a bandwidth of the displacement sensor to improve the precision and accuracy of the magnetic bearing is necessary.

As displacement sensor for detecting a change in position of a rotary body of the magnetic bearing, inductive displacement sensors for measuring a displacement of the rotary body through detection of a change in a mutual inductance generated according to a change of position of the rotary body are widely utilized to control a rotary body of a magnetic bearing. An inductive displacement sensor according to the related art obtains a difference between an electrical signal produced in one coil through a separate differential circuit and a signal produced in a coil compared with the coil after the same power source is supplied to the coils, and thus a minimum of one differential circuit needs to be realized for one displacement sensor.

An inductive displacement sensor according to the related art using a displacement detection circuit through half-wave rectification or full-wave rectification inevitably generates ripples having a harmonic component of a drive frequency in a displacement signal detecting process because of a property of the detection circuit. As a low pass filter having a low interruption frequency is used to remove the ripples, an output displacement signal has a frequency lower than a drive frequency. The low frequency of the output displacement signal lowers an accuracy and a precision of the displacement sensor.

In addition, the problem of the inductive displacement sensor according the related art lowers an accuracy and a precision of control of a magnetic bearing.

DISCLOSURE

Technical Problem

The present invention provides a displacement sensor which can improve precision.

The present invention also provides a magnetic bearing system including the displacement.

Meanwhile, the effects of the present invention are not limited thereto, and may be variously expanded without departing from the spirit and region of the present invention.

Technical Solution

In order to achieve the object, a displacement sensor according to an aspect of the present invention includes a first coil unit, a second coil unit, a sensor drive means, and a detection circuit. The first coil unit includes at least one first coil. The second coil unit includes at least one second coil differentially connected to one side of the at least one first coil of the first coil unit. The sensor drive means supplies a first power source voltage and a second power source voltage having the same drive frequency to the first coil unit and the second coil unit, respectively. The detection circuit extracts displacement information from a differential signal produced by the first coil unit and the second coil unit due to a change in inductances of the at least one first coil and the at least one second coil according to a position change of a displacement measurement object.

According to an embodiment, the detection circuit may include a synchronizing unit and a sample-and-hold circuit. The synchronizing unit produces a timing signal having the drive frequency. The sample-and-hold circuit samples and holds the differential signal produced by the first coil unit and the second coil unit based on the timing signal input from the synchronizing unit to produce amplitude information.

According to another embodiment, the detection circuit may further include a band pass filter and a low pass filter. The band pass filter removes low frequency and high frequency components of the differential signal produced by the first coil unit and the second coil unit. The low pass filter removes high frequency components of the output signals of the sample-and-hold circuit.

According to still another embodiment, an interruption frequency of the low pass filter may be higher than the drive frequency.

According to yet another embodiment, the at least one first coil of the first coil unit and the at least one second coil of the second coil unit may be opposite to each other with respect to the displacement measurement object.

According to a further embodiment, one side of the at least first coil of the first coil unit and one side of the at least second coil of the second coil unit may be differentially connected to each other, and a phase difference between the first power source voltage and the second power source voltage may be 180 degrees.

In order to achieve the object, a magnetic bearing system includes a rotary body, a motor, at least one magnetic bearing, and at least one displacement sensor. The at least one magnetic bearing supports the rotary body rotated by the motor. The at least one displacement sensor detects a displacement of the rotary body. The at least displacement sensor includes a first coil unit, a second coil unit, a sensor drive means, and a detection circuit. The first coil unit includes at least one first coil. The second coil unit includes at least one second coil differentially connected to one side of the at least one first coil of the first coil unit. The sensor drive means supplies a first power source voltage and a second power source voltage having the same drive frequency to the first coil unit and the second coil unit, respectively. The detection circuit extracts displacement information from a differential signal produced by the first coil unit and the second coil unit due to a change in inductances of the at least one first coil and the at least one second coil according to a position change of a displacement measurement object.

According to an embodiment of the magnetic bearing system, the detection circuit may include a synchronizing unit and a sample-and-hold circuit. The synchronizing unit produces a timing signal having the drive frequency. The sample-and-hold circuit samples and holds the output signal produced by the first coil unit and the second coil unit based on the timing signal input from the synchronizing unit to produce amplitude information.

According to another embodiment of the magnetic bearing system, the detection circuit may further include a band pass filter and a low pass filter. The band pass filter removes low frequency and high frequency components of the differential signal produced by the first coil unit and the second coil unit. The low pass filter removes high frequency components of the output signals of the band pass filter and the sample-and-hold circuit.

According to still another embodiment of the magnetic bearing system, an interruption frequency of the low pass filter may be higher than the drive frequency.

According to yet another embodiment of the magnetic bearing system, the at least one first coil of the first coil unit and the at least one second coil of the second coil unit may be opposite to each other with respect to the displacement measurement object.

According to a further embodiment of the magnetic bearing system, one side of the at least first coil of the first coil unit and one side of the at least second coil of the second coil unit may be differentially connected to each other, and a phase difference between the first power source voltage and the second power source voltage may be 180 degrees.

Advantageous Effects

According to the embodiments of the present invention, an accuracy and a precision of a displacement sensor for a high-speed rotary body can be increased by improving frequency characteristics of an output signal of the displacement sensor. Further, an accuracy and a precision for control of a magnetic bearing for a high-speed rotary body can be increased.

| [Description of Reference Numerals] | |
| --- | --- |
| 10: Displacement sensor | 20a: Radial displacement sensor |
| 20b: Axial displacement sensor | 40: Magnetic bearing system |
| 22a, 24b: Rotary column | 22b: Rotary plate |
| 100: Sensor drive means | 110: First voltage source |
| 120: Second voltage source | |
| 210, 210a, 210b: First coil unit | 212a, 214a, 212b: First coil |
| 220, 220a, 220b: Second coil unit | 222a, 224a, 222b: Second coil |
| 300: Detection circuit | 310: Synchronizing unit |
| 320: Sample-and-hole circuit | 330: Band-pass filter |
| 340: Low-pass filter | |
| 410: Rotary column | 420: Rotary plate |
| 430: Motor | 440a, 440b, 460: Displacement sensor |
| 450a, 450b, 470: Magnetic bearing | |

BEST MODE

Mode for Invention

Specific structural or functional descriptions of the embodiments of the present invention disclosed in the specification are exemplified for the purpose of describing the embodiments of the present invention only, and the embodiments of the present invention may be carried out in various forms and should not be construed to limit the embodiments described herein.

In the present invention, various modifications may be applied and various forms may be realized, and thus specific embodiments will be exemplified in the drawings and be described in detail in the specification. However, the present invention is not limited to specifically disclosed forms, and should be construed to include all modifications, equivalents, and replacements included in the spirit and technical range of the present invention.

The terms such as first and second may be used to describe various constituent elements, but the elements should not be limited by the terms. The terms are used only for the purpose of distinguishing one element from another element. For example, a first element may be named a second element without departing from the scope of the present invention, and a second element may be named a first element in a similar way.

When it is mentioned that a certain element is "connected to" or "electrically connected to" a second element, the first element may be directly connected or electrically connected to the second element, but it should be understood that a third element may intervene therebetween. On the other hand, when it is mentioned that a certain element is "directly connected to" or "directly electrically connected to" a second element, it should be understood that there is no third element therebetween. The other expressions for describing a relationship between constituent elements such as "between" and "directly between, or "adjacent to" and "directly adjacent to" are construed in the same way.

The terms used in the application are used to describe specific embodiments only, and it not intended to limit the present invention. A singular expression includes a plural expression as long as they are clearly distinguished in the context. In the application, it should be understood that the terms such as "comprising", "including" are intended to express that features, numbers, steps, operations, constituent elements, part, or combinations thereof described in the specification are present and do not exclude existence or additions of one or more other features, numbers, steps, operations, constituent elements, part, or combinations thereof.

Unless defined in a different way, all the terms used herein including technical and scientific terms have the same meanings as understood by those skilled in the art to which the present invention pertains. Such terms as defined in generally used dictionaries should be construed to have the same meanings as those of the contexts of the related art, and unless clearly defined in the application, they should not be construed to have ideally or excessively formal meanings.

Hereinafter, exemplary embodiments of the present invention will be described in detail with reference to the accompanying drawings. The same constituent elements in the drawings are denoted by the same reference numerals, and a repeated description of the same elements will be omitted.

Figure 1:
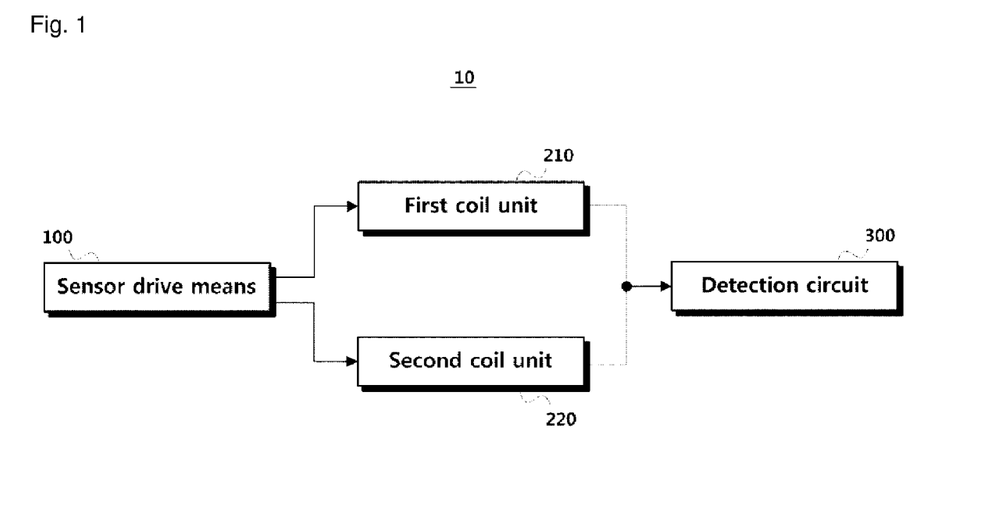
FIG. 1 is a block diagram of a displacement sensor according to an embodiment of the present invention.

FIG. 1 is a block diagram of a displacement sensor according to an embodiment of the present invention.

Referring to FIG. 1, the displacement sensor 10 according to an embodiment of the present invention includes a first coil unit 210, a second coil unit 220, a sensor drive means 100, and a detection circuit 300. The first coil unit 210 includes at least one first coil. The second coil unit 220 includes at least one second coil differentially connected to one side of the at least one coil of the first coil unit 210. The sensor drive means 100 supplies a first power source voltage V1 and a second power source voltage V2 having the same drive frequency to the first coil unit 210 and the second coil unit 220, respectively. The detection circuit 300 extracts displacement information from a differential signal Vo produced by the first coil unit 210 and the second coil unit 220 due to a change in inductances of the at least one first coil and the at least one second coil according to a position change of a displacement measurement object.

One side of the at least one first coil is connected to the AC voltage V1 supplied by the sensor drive means 100, and one side of the at least one second coil is connected to the AC voltage V1 supplied by the sensor drive means 100. An opposite side of the at least one first coil and an opposite side of the at least one second coil are differentially connected to each other.

Figure 2:
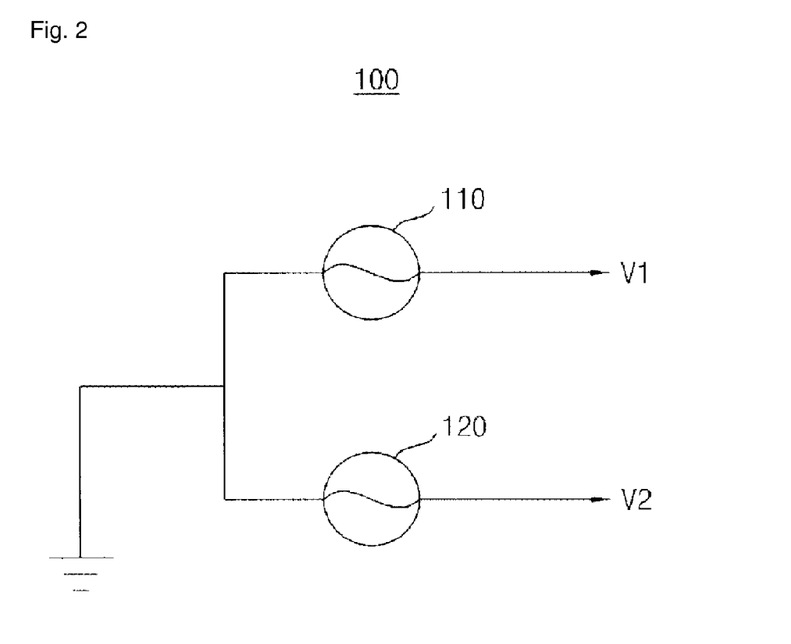
FIG. 2 is a circuit diagram illustrating an example of a detection circuit provided in the displacement sensor of FIG. 1.

FIG. 2 is a circuit diagram illustrating an example of a sensor drive means provided in the displacement sensor of FIG. 1.

Referring to FIG. 2, the sensor drive means 100 may transfer a power source voltage having the same frequency and different phases to the first coil unit 210 and the second coil unit 220 illustrated in FIG. 1. For example, an AC voltage having the same drive frequency may be input to the first and second coil units 210 and 220. The drive frequency may be higher than 1 KHz and lower than 100 KHz, and an AC waveform may have the form of a sine wave, a spherical wave, a triangle wave, a saw-tooth wave, or the like. Amplitudes of the first voltage V1 and the second voltage V2 supplied by the sensor drive means 100 may have the same size.

The at least one first coil of the first coil unit 210 may be differentially connected to the at least one second coil of the second coil unit 220. A differential signal Vo according to a displacement of the displacement measurement object may be generated at a connecting portion where the at least one first coil of the first coil unit 210 and the at least one second coil of the second coil unit 220 are differentially connected to each other. The differential signal Vo may be input to a detection circuit 330 to be processed, and thus may be converted into a displacement signal Vd in the form of a direct current. Frequency characteristics of the displacement signal Vd may become different according to characteristics of the detection circuit 330.

The detection circuit 300 may include a synchronizing unit 310 and a sample-and-hold circuit 320. The synchronizing unit 310 produces a timing signal Vp having the drive frequency. The sample-and-hold circuit 320 samples and holds the differential signal Vd produced by the first coil unit 210 and the second coil unit 220 based on a timing signal Vp input from the synchronizing unit 310 to produce amplitude information.

The number of differential signals Vd becomes different depending on the number of coils of the first coil unit 210 and the second coil unit 220. According to the embodiment of the present invention, the number of differential signal Vd may be two or more. Thus, the detection circuit 300 may include a plurality of sample-and-hold circuits 320 for processing the differential signals Vd. The second coil unit 220 may include the second coils the number of which is the same as that of the first coils. The synchronizing unit 310 may receive frequency information or synchronization information for producing a synchronizing signal Vp from the sensor drive means 100. As an alternative example, the synchronizing unit 310 may transfer frequency information or synchronization information to the sensor drive means 100.

Figure 3:
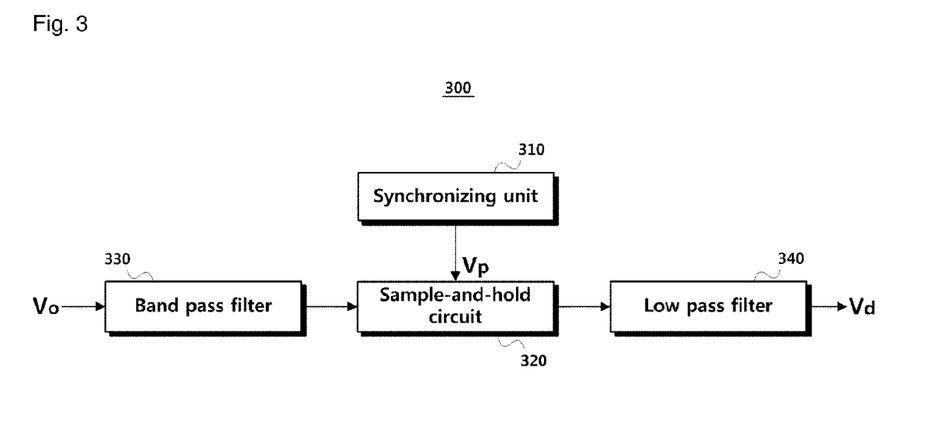
FIG. 3 is a block diagram illustrating an example of a sensor drive means provided in the displacement sensor of FIG. 1.

FIG. 3 is a block diagram illustrating an example of a sensor drive means provided in the displacement sensor of FIG. 1.

Referring to FIG. 3, the displacement sensor 10 of FIG. 1 may further include a band pass filter 330 and a low pass filter 340. The band pass filter 330 removes low frequency and high frequency components of the differential signal Vd produced by the first coil unit 210 and the second coil unit 220. The low pass filter 340 removes high frequency components of the output signals of the band pass filter 330 and the sample-and-hold circuit 320.

When the detection circuit 300 further includes the band pass filter 330 or the low pass filter 340, the synchronizing unit 310 may produce a timing signal, considering a time period for which a signal passes through the band pass filter 330 or the low pass filter 340. The synchronizing unit 310 may produce a timing signal Vp so that when a differential signal Vo is maximal, the sample-and-hold circuit 320 samples and holds the differential signal Vo to produce a displacement signal Vd. The synchronizing unit 119 may produce a timing signal so that the sample-and-hold circuit 117 samples and holds output voltages Vo1 and Vo2 at a time point when the output voltages Vo1 and Vo2 are not a peak voltage to produce detection signals VS1 and VS2.

According to the embodiment of the present invention, a low-level interruption frequency of the band pass filter 330 may be lower than a drive frequency of the power source voltages applied to the first and second coil units 210 and 220, and a high-level interruption frequency thereof may be lower than 2 times the drive frequency.

According to the embodiment of the present invention, the band pass filter 330 or the low pass filter 340 may identically maintain the phases of the drive frequency components of the differential signal Vo and the output signal of the sample-and-hold circuit 320.

The interruption frequency of the low pass filter 340 may have a value higher than the drive frequency.

The interruption frequency of the low pass filter 340 may be higher than the drive frequency of the power source voltages applied to the first and second coil units 210 and 220 and lower than 2 times the drive frequency.

The at least one first coil of the first coil unit 210 and the at least one second coil of the second coil unit 220 may be opposite to each other with respect to the displacement measurement object.

One side of the at least first coil of the first coil unit 210 and one side of the at least second coil of the second coil unit 220 may be differentially connected to each other, and a phase difference between the first power source voltage 110 and the second power source voltage 120 may be 180 degrees.

Figure 4:
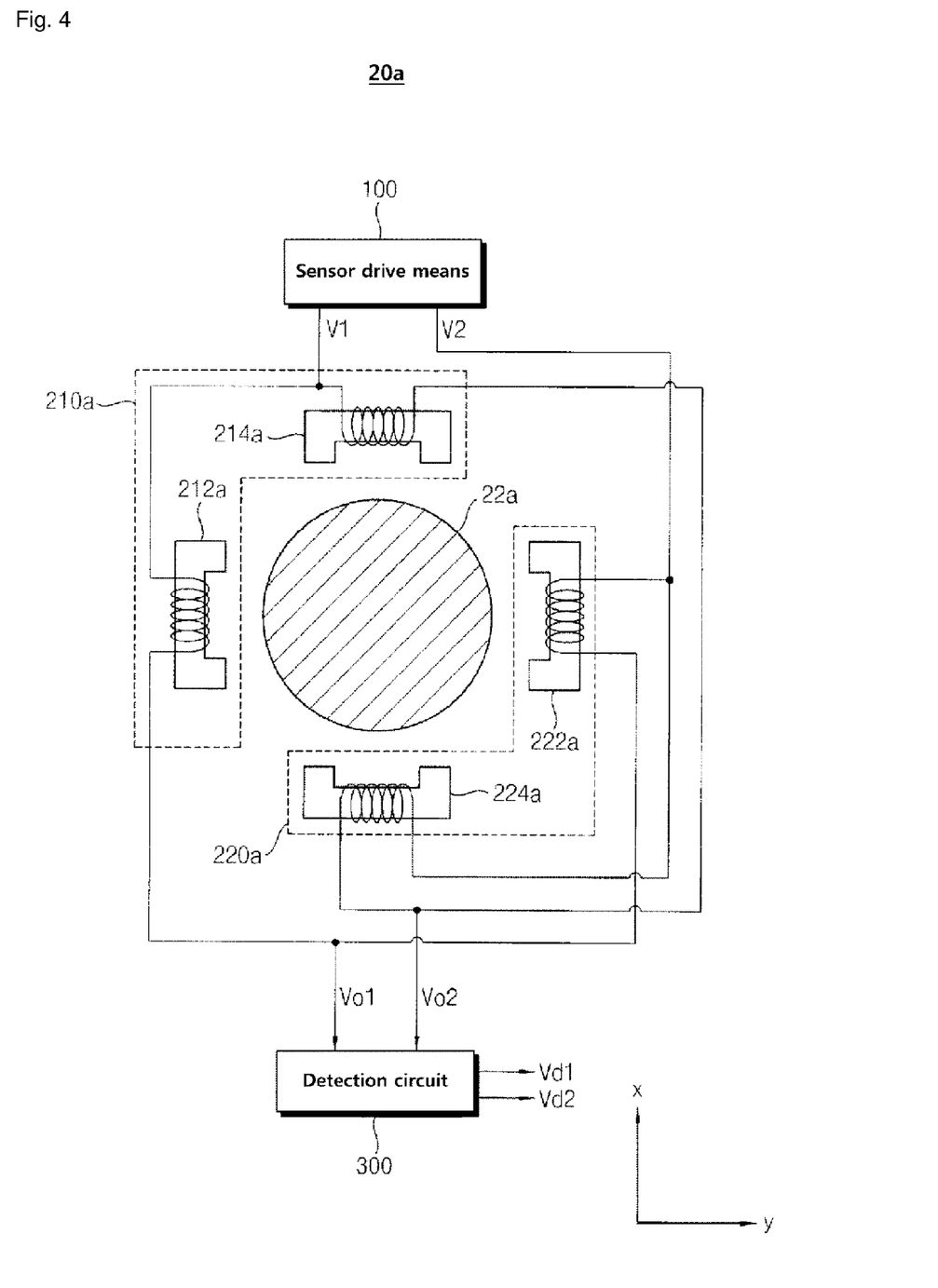
FIG. 4 is a circuit diagram illustrating a radial displacement sensor according to an embodiment of the present invention.

FIG. 4 is a circuit diagram illustrating a radial displacement sensor 20*a* according to an embodiment of the present invention.

Referring to FIG. 4, the first coil unit 210*a* may include two first coils 212*a* and 214*a*, and the second coil unit 220*a* may include two second coils 222*a* and 224*a*. A displacement measurement object of the radial displacement sensor 20*a* may be a rotary body 22*a* rotated about an axis perpendicular to the drawing, and the first coil 212*a* and 214*a* and the second coil 222*a* and 224*a* may be disposed such that a direction in which the first coil 212*a* and the second coil 222*a* face each other and a direction in which the first coil 214*a* and the second coil 224*a* face each other perpendicular to each other, to secure a displacement measuring efficiency. In this case, the total number of the differential signals Vo is two (Vo1 and Vo2), and as mentioned above, the detection circuit 300 may include two sample-and-hold circuits. In addition, the number of the displacement signals Vd which are output signals of the detection circuit 300 is two (Vd1 and Vd2). By using the radial displacement sensor 20*a*, a displacement in the x-axis direction and a displacement in the y-axis direction of the rotary body 22 which is a displacement measurement object in FIG. 4 may be measured.

If the rotary body 22*a* deviates from a rotation axis, a magnetic resistance of a space through which magnetic fields formed by the coils according to a positional relationship between the rotary body 22*a* and the first coils 212*a* and 214*a* and the second coils 222*a* and 224*a* varies. Thus, inductances of the first coils 212*a* and 214*a* and the second coils 222*a* and 224*a* vary. The changes in inductances causes a change of the differential signals Vo1 and Vo2 which is output signals of the first coils 212*a* and 214*a* and the second coils 222*a* and 224*a*, and thus a displacement of the rotary body 22*a* can be detected.

When the first coil 212*a* and the second coil 222*a* are differentially coupled to each other and the first coil 214*a* and the second coil 224*a* are differentially coupled to each other, voltage signals of the first coils and second coils according to a displacement of the rotary body 22*a* have opposite polarities, respectively, and thus the differential signals Vo1 and Vo2 may be obtained without using a separate differential circuit at a point where the coils are connected to each other.

Figure 5:
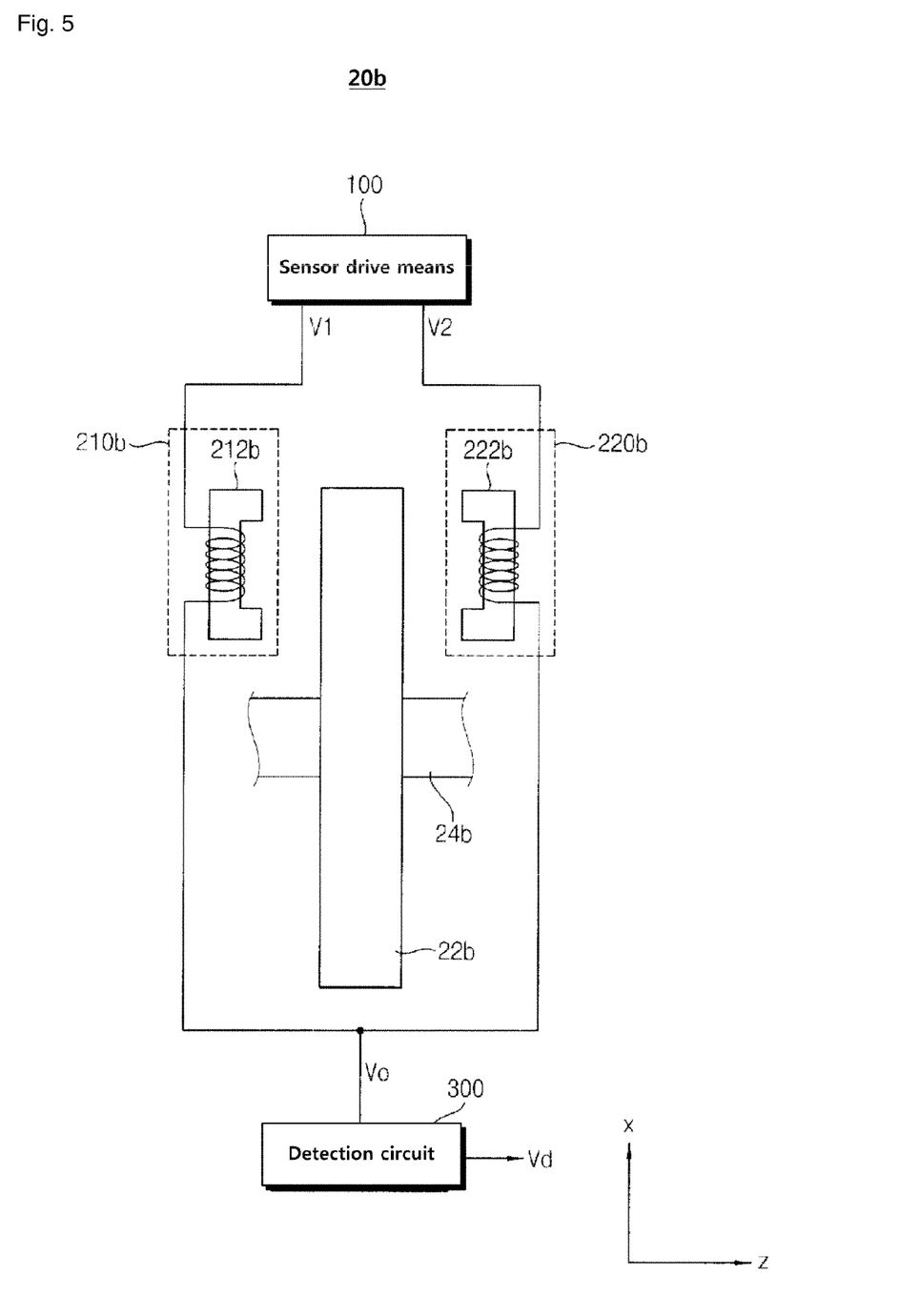
FIG. 5 is a circuit diagram illustrating an axial displacement sensor according to an embodiment of the present invention.

FIG. 5 is a circuit diagram illustrating an axial displacement sensor 20*b* according to an embodiment of the present invention.

Referring to FIG. 5, the first coil unit may include one first coil 212*b*, and the second coil unit 220*a* may include one second coil 222*b*. A displacement measurement object of the axial displacement sensor 20*b* is a rotary plate 22*b* rotated about the z-axis which is an axis in a direction parallel to the drawing, or is a rotary column 24*b* fastened while sharing the rotary axis, and the first coil 212*b* and the second coil 222*b* may be disposed vertically in the z-axis direction of the rotary plate 22*b*. By using the axial displacement sensor 20*b*, a displacement of the rotary plate 22*a* or the rotary column 24*b* in the z-axis direction in FIG. 4 which is a displacement measurement object can be measured.

Figure 6:
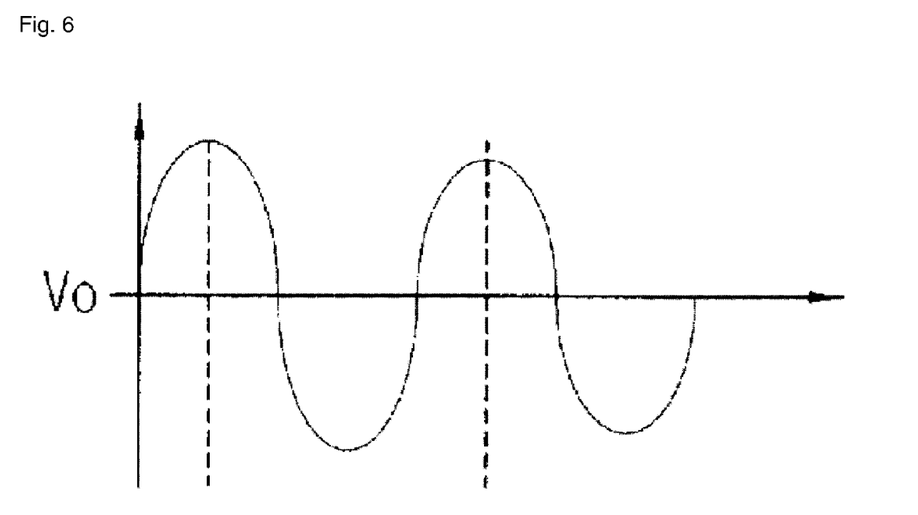
FIG. 6 is a waveform diagram illustrating an example of a differential signal of output signals of a first coil unit and a second coil unit of FIG. 1.

FIG. 6 is a waveform diagram illustrating an example of a differential signal Vo of output signals of the first coil unit 210 and a second coil unit 220 of FIG. 1.

Referring to FIG. 6, a frequency of the differential signal Vo is the same as the drive frequency, and an amplitude of the waveform is proportional to a displacement of the rotary body which is a displacement measurement object. For example, if the displacement degree is reduced, an absolute value of the second peak can become smaller than an absolute value of the first peak as in the drawing of FIG. 6.

Figure 7:
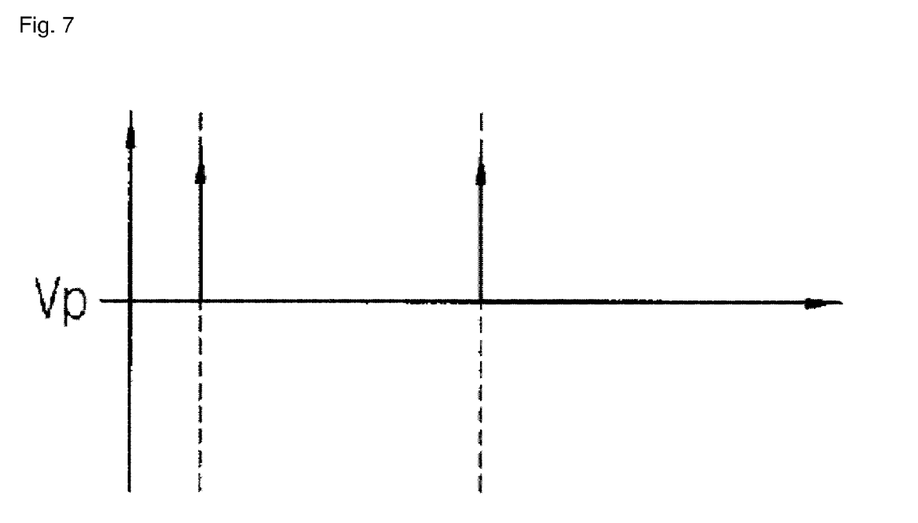
FIG. 7 is a waveform diagram illustrating an example of a timing signal which is an output signal of a synchronizing unit of FIG. 3.

FIG. 7 is a waveform diagram illustrating an example of a timing signal Vo which is an output signal of a synchronizing unit 310 of FIG. 3.

Referring to FIG. 7, a frequency of the timing signal Vp is identical with the drive frequency and a phase thereof is identical with that of the differential signal Vo, and thus when the differential signal Vo is maximal, the timing signal Vp becomes an impulse row signal having an impulse of a predetermine magnitude. An ideal impulse row signal cannot be realized, and the impulse row signal may be a spherical pulse row having a narrow width.

Figure 8:
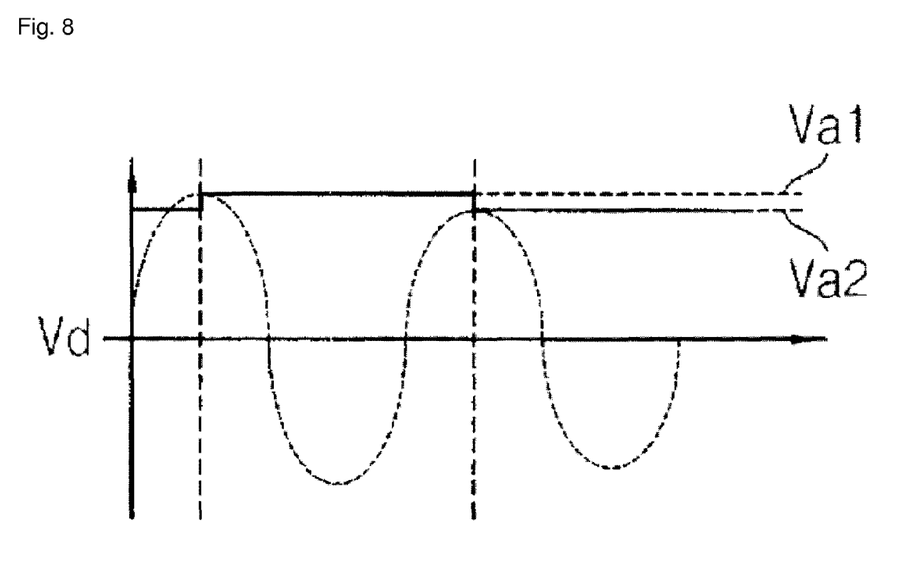
FIG. 8 is a waveform diagram illustrating an example of a displacement signal which is an output signal of a detection circuit of FIG. 1.

FIG. 8 is a waveform diagram illustrating an example of a displacement signal Vd which is an output signal of a detection circuit 300 of FIG. 1.

Referring to FIG. 8, the displacement signal Vd is produced by sampling a value of the differential signal Vo based on a timing signal Vp and holding the sampled value Va1 until the succeeding sample with the sample-and-hold circuit 320 is maintained. For example, while an output of the displacement signal is maintained at the first sampled value Va1, if the displacement degree decreases over time as in the waveform diagram of FIG. 6, the secondly sampled value Va2 may become smaller than the first sampled value Va1.

Figure 9:
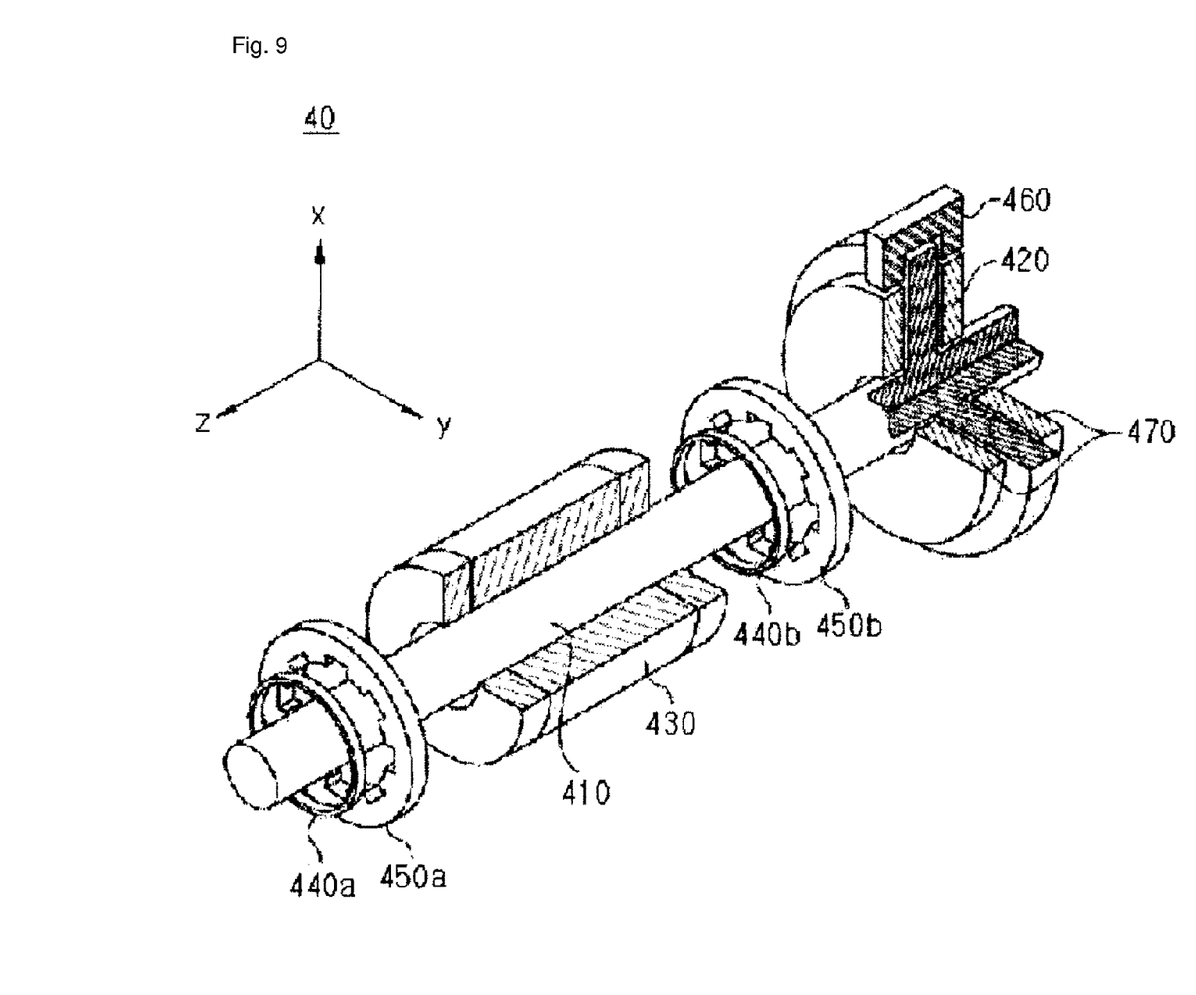
FIG. 9 is a perspective view illustrating a magnetic bearing system according to an embodiment of the present invention.

FIG. 9 is a perspective view illustrating a magnetic bearing system according to an embodiment of the present invention.

Referring to FIG. 9, the rotary bodies 410 and 420 rotated by the motor 430 are supported by the two radial bearings 450*a* and 450*b* in the x-axis and y-axis directions and supported by one axial bearing 470 in the z-axis direction. Displacement information of the rotary column 410 and the rotary plate 420 is necessary to control the magnetic bearings, and may be obtained through three displacement sensors 440*a*, 440*b*, and 460. The radial bearings 450*a* and 450*b* support and controls the rotary column 410 so that the rotary column 410 may not translated in the x-axis or y-axis direction. The axial bearing 470 supports and controls the rotary plate 420 fastened to the rotary column 410 so that the rotary plate 420 may not translated in the z-axis direction. The rotary column 410 and the rotary plate 420 fastened to the rotary column 410 may be supported and controlled not to be rotated about the x-axis or y-axis through the support and control.

In the embodiment, the magnetic bearing system 40 includes rotary bodies 410 and 420, a motor 430 for rotating the rotary bodies 410 and 420, at least one magnetic bearing 450*a*, 450*b*, and 470, and at least one displacement sensor 440*a*, 440*b*, and 460. The at least one magnetic bearing 450*a*, 450*b*, and 470 supports the rotary bodies 410 and 420 rotated by the motor 430. The at least one displacement sensor 440*a*, 440*b*, and 460 detects displacements of the rotary bodies 410 and 420. The at least one displacement sensor 440*a*, 440*b*, and 460 includes a first coil unit 210, a second coil unit 220, a sensor drive means 100, and a detection circuit 300. The first coil unit 210 includes at least one first coil. The second coil unit 220 includes at least one second coil differentially connected to one side of the at least one coil of the first coil unit 210. The sensor drive means 100 supplies a first power source voltage V1 and a second power source voltage V2 having the same drive frequency to the first coil unit 210 and the second coil unit 220, respectively. The detection circuit 300 extracts displacement information from a differential signal Vo produced by the first coil unit 210 and the second coil unit 220 due to a change in inductances of the at least one first coil and the at least one second coil according to a position change of a displacement measurement object.

In the embodiment, the magnetic bearing 450a, 450b, and 470 may employ a magnetic suction type, a magnetic repulsive type, an inductive type, a minus effect type, and the like. A magnitude of a current supplied to an electromagnet of the magnetic bearing may be regulated to support and control the rotary bodies through the magnetic bearing. The magnetic bearing system may include a plurality of displacement sensors and a plurality of magnetic bearings, and the disposition order thereof may be changed.

The displacement sensor included in the magnetic bearing system according to the embodiment of the present invention is similar to the displacement sensor 10 described with reference to FIGS. 1 to 6, and a repeated description thereof will be omitted.

Referring back to FIG. 1, a displacement measuring method according to an embodiment of the present invention will be described hereinbelow.

In the displacement measuring method according to the embodiment of the present invention, a first power source voltage and a second power source voltage having the same drive frequency are supplied to a first coil unit 210 including at least one first coil and a second coil unit 220 including at least one second coil differentially connected to the at least one first coil. The first power source voltage and the second power source voltage may be supplied to the first coil unit 210 and the second coil unit 220 from the sensor drive unit 100. Displacement information is extracted from a differential signal Vo produced by the first coil unit 210 and the second coil unit 220 due to an inductance change of the at least one first coil and the at least one second coil according to a change in position of a displacement measurement object.

The displacement measuring method according to the embodiment of the present invention is similar to the displacement sensor 10 described with reference to FIGS. 1 to 3, and a repeated description thereof will be omitted.

The displacement sensor according to the embodiments of the present invention differentially connects the coils functioning to convert a displacement of a displacement measurement object into an electrical signal, thereby simplifying an electrical configuration. In addition, frequency characteristics having the same level as a drive frequency of an AC voltage applied to a coil unit can be maintained by using a sample-and-hold circuit to detect displacement information from a differential signal produced by the coils, making it possible to increase an accuracy and a precision of the sensor for a high speed rotary body.

The magnetic bearing apparatus according to the embodiments of the present invention utilizes the displacement sensors according to the embodiments to simplify an electrical structure, making it possible to increase an accuracy and a precision of the sensor for a high speed rotary body.

The present invention can be usefully utilized in an arbitrary displacement sensor system. Further, the present invention can be usefully utilized in detection of a displacement of various objects such as detection of a magnetic bearing, detection of a finite displacement, detection of vibration of a high-speed rotor, and measurement of a thickness of a metal.

While the present invention has been described with reference to the exemplary embodiments until now, it will be understood by those skilled in the art to which the present invention pertains that the present invention may be variously modified and changed without departing from the sprit and scope of the present invention described in the claims.

The invention claimed is:

1. A displacement sensor comprising:
  a first coil unit including at least one first coil;
  a second coil unit including at least one second coil differentially connected to one side of the at least one first coil of the first coil unit;
  a sensor drive means for supplying a first power source voltage and a second power source voltage having the same drive frequency to the first coil unit and the second coil unit, respectively; and
  a detection circuit for extracting displacement information from a differential signal produced by the first coil unit and the second coil unit due to a change in inductances of the at least one first coil and the at least one second coil according to a position change of a displacement measurement object,
  wherein the detection circuit includes:
    a band pass filter for removing low frequency and high frequency components of the differential signal produced by the first coil unit and the second coil unit;
    a synchronizing unit for producing a timing signal having the drive frequency;
    a sample-and-hold circuit for sampling and holding the differential signal produced by the first coil unit and the second coil unit based on the timing signal input from the synchronizing unit to produce amplitude information; and
    a low pass filter for removing high frequency components of the output signals of the sample-and-hold circuit,
  wherein the synchronizing unit produces the timing signal, considering a time period for which the differential signal produced by the first coil unit and the second coil unit passes through the band pass filter and the low pass filter.

2. The displacement sensor of claim 1, wherein an interruption frequency of the low pass filter is higher than the drive frequency.

3. The displacement sensor of claim 1, wherein the at least one first coil of the first coil unit and the at least one second coil of the second coil unit are opposite to each other with respect to the displacement measurement object.

4. The displacement sensor of claim 1, wherein one side of the at least first coil of the first coil unit and one side of the at least second coil of the second coil unit are differentially connected to each other, and a phase difference between the first power source voltage and the second power source voltage is 180 degrees.

5. A displacement measuring method comprising:
  (a) supplying a first power source voltage and a second power source voltage having the same drive frequency to a first coil unit including at least one first coil and a second coil unit including at least one second coil differentially connected to the at least one first coil; and
  (b) extracting displacement information from a differential signal produced by the first coil unit and the second coil unit due to a change in inductances of the at least one first coil and the at least one second coil according to a change in position of a displacement measurement object, wherein the step (b) includes:
- (b1) removing, by a band pass filter, low frequency and high frequency components of the differential signal produced by the first coil unit and the second coil unit;
- (b2) producing, by a synchronizing unit, a timing signal having the drive frequency;
- (b3) sampling and holding, by a sample-and-hold circuit, the differential signal produced by the first coil unit and the second coil unit based on the timing signal input from the synchronizing unit to produce amplitude information; and
- (b4) removing, by a low pass filter, high frequency components of the output signals of the sample-and-hold circuit, wherein the timing signal is produced by the synchronizing unit, considering a time period for which the differential signal produced by the first coil unit and the second coil unit passes through the band pass filter and the low pass filter.

* * * * *